(12) United States Patent
Van Vliet et al.

(10) Patent No.: US 12,298,084 B2
(45) Date of Patent: May 13, 2025

(54) INTERNAL CONFIGURATION FOR REDOX-BASED HEAT STORAGE SYSTEMS

(71) Applicant: Nederlandse Organisatie voor toegepast-natuurwetenschappelijk onderzoek TNO, s-Gravenhage (NL)

(72) Inventors: Laurens Daniël Van Vliet, 's-Gravenhage (NL); Martin Mohana, 's-Gravenhage (NL); Roberta Veronezi Figueiredo, 's-Gravenhage (NL); Pavol Bodis, Hoofddorp (NL); Ruud Cuypers, Rijswijk (NL); Leonard Ferdinand Gerard Geers, Valkenburg (NL); Arie Jacobus Kalkman, Zwijndrecht (NL)

(73) Assignee: NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 220 days.

(21) Appl. No.: 17/906,306

(22) PCT Filed: Mar. 19, 2021

(86) PCT No.: PCT/NL2021/050188
§ 371 (c)(1),
(2) Date: Sep. 14, 2022

(87) PCT Pub. No.: WO2021/187987
PCT Pub. Date: Sep. 23, 2021

(65) Prior Publication Data
US 2023/0139510 A1    May 4, 2023

(30) Foreign Application Priority Data
Mar. 19, 2020    (EP) .................................... 20164249

(51) Int. Cl.
*B01J 8/04*    (2006.01)
*F28D 20/00*    (2006.01)

(52) U.S. Cl.
CPC .......... *F28D 20/003* (2013.01); *B01J 8/0453* (2013.01); *B01J 8/0496* (2013.01); *B01J 2208/00398* (2013.01); *B01J 2208/00495* (2013.01)

(58) Field of Classification Search
CPC ..... F28D 20/003; B01J 8/0453; B01J 8/0469; B01J 8/0415; B01J 2208/00495
See application file for complete search history.

(56) References Cited

U.S. PATENT DOCUMENTS

| 4,034,569 A | * | 7/1977 | Tchernev | F25B 17/08 |
| | | | | 62/235.1 |
| 4,161,211 A | * | 7/1979 | Duffy | C09K 5/16 |
| | | | | 165/104.11 |

(Continued)

FOREIGN PATENT DOCUMENTS

| EP | 3006883 A1 | 4/2016 |
| EP | 3396289 A1 | 10/2018 |

(Continued)

OTHER PUBLICATIONS

International Search Report issued Jun. 1, 2021 in PCT/NL2021/050188.

(Continued)

*Primary Examiner* — Nelson J Nieves
(74) *Attorney, Agent, or Firm* — Ice Miller LLP

(57) ABSTRACT

The invention is directed to a system for energy storage comprising a chemical combustion reactor comprising a reactor segment that comprises at least two porous active fixed beds that are separated by an inactive insulating layer which are at least partially surrounded by an insulating (Continued)

mantle. The active beds comprise a metal and/or oxide thereof.

20 Claims, 9 Drawing Sheets

(56) References Cited

U.S. PATENT DOCUMENTS

| | | | | |
|---|---|---|---|---|
| 4,259,312 | A * | 3/1981 | Flockenhaus | C07C 1/042 |
| | | | | 423/655 |
| 4,341,262 | A * | 7/1982 | Alspaugh | F28D 20/023 |
| | | | | 165/10 |
| 4,424,397 | A * | 1/1984 | Hoene | C07C 45/38 |
| | | | | 568/472 |
| 4,470,931 | A * | 9/1984 | Callahan | C07C 253/26 |
| | | | | 558/324 |
| 4,928,496 | A * | 5/1990 | Wallace | C01B 3/0068 |
| | | | | 165/104.12 |
| 5,980,748 | A * | 11/1999 | Auger | B01J 8/0453 |
| | | | | 210/660 |
| 6,117,812 | A * | 9/2000 | Gao | B01D 3/009 |
| | | | | 502/313 |
| 6,478,077 | B1 * | 11/2002 | Story | C01B 3/0005 |
| | | | | 62/480 |
| 7,326,281 | B2 | 2/2008 | Fujita | F28F 1/32 |
| | | | | 96/108 |
| 8,778,063 | B2 * | 7/2014 | Mudawar | C01B 3/0031 |
| | | | | 165/104.19 |
| 2004/0225085 | A1 | 11/2004 | Glover | B01D 53/86 |
| | | | | 526/67 |
| 2007/0141322 | A1 * | 6/2007 | Kamper | B82Y 30/00 |
| | | | | 428/317.9 |
| 2010/0166631 | A1 * | 7/2010 | Schwefer | B01J 8/008 |
| | | | | 422/198 |
| 2011/0277972 | A1 * | 11/2011 | Mudawar | F28F 1/12 |
| | | | | 165/138 |
| 2011/0284184 | A1 * | 11/2011 | Mudawar | C01B 3/0031 |
| | | | | 165/104.19 |
| 2012/0251394 | A1 * | 10/2012 | Komaki | F28D 20/003 |
| | | | | 422/162 |
| 2012/0277331 | A1 * | 11/2012 | Gamlin | B01J 8/067 |
| | | | | 220/676 |
| 2014/0151602 | A1 * | 6/2014 | Okada | C01B 3/16 |
| | | | | 422/162 |
| 2018/0008952 | A1 * | 1/2018 | Glover | F15D 1/00 |
| 2018/0180325 | A1 | 6/2018 | Lavine | |
| 2018/0208527 | A1 * | 7/2018 | Khokhar | B01J 29/40 |
| 2018/0372422 | A1 * | 12/2018 | Noguchi | F01N 3/208 |
| 2019/0323782 | A1 * | 10/2019 | Kono | C09K 5/16 |
| 2020/0173734 | A1 * | 6/2020 | Cuypers | F23C 99/00 |
| 2021/0088290 | A1 * | 3/2021 | Cuypers | F28D 20/003 |
| 2021/0162361 | A1 * | 6/2021 | Baratto | B01J 8/0415 |
| 2021/0325124 | A1 * | 10/2021 | Klausner | F28D 20/003 |
| 2022/0016590 | A1 * | 1/2022 | Chang | C01B 3/38 |
| 2023/0266074 | A1 * | 8/2023 | Liu | B01D 53/62 |
| | | | | 422/200 |

FOREIGN PATENT DOCUMENTS

| | | | | |
|---|---|---|---|---|
| EP | 3453997 | A1 * | 3/2019 | B01J 8/0285 |
| JP | S6152550 | A | 3/1986 | |
| JP | S62288495 | A | 12/1987 | |

OTHER PUBLICATIONS

Luo, Ming, et al., "Review of hydrogen production using chemical-looping technology," (2017) downloaded from http://dx.doi.org/10.1016/j.rser.2017.07.007.

* cited by examiner

INTERNAL CONFIGURATION FOR REDOX-BASED HEAT STORAGE SYSTEMS

CROSS-REFERENCE TO RELATED APPLICATION

This application is a Section 371 of International Application No. PCT/NL2021/050188 filed Mar. 19, 2021, which was published in the English language Sep. 23, 2021, under International Publication No. WO 2021/187987 A1, which claims priority to European Patent Application No. 20164249.3 filed Mar. 19, 2020, the disclosures of which are incorporated herein by reference in their entireties.

The invention is in the field of energy storage and conversion. The invention is in particular directed to a system for thermal energy storage.

The supply of alternative energy sources such as solar, wind and hydro-powered energy generally depends on the amount of available sunlight, wind, water etc. As such, these alternative energy sources are associated with fluctuating supplies, and as society moves from fossil-fuel based energy supplies to alternative energy sources, the need for energy storage systems to accommodate these fluctuating supplies and to cover mismatch between supply and demand has become more pronounced, in particular on the level of households or neighborhoods.

Several systems for energy storage on the level of households or neighborhoods have been proposed. Examples of energy storage devices include hot water tanks (boiler technology), lithium-ion batteries and thermochemical energy storage devices.

An example of a thermochemical energy storage for concentrating solar power is disclosed in US2018/180325. The system is based on an ammonia based thermochemical energy storage system, which may dissociate endothermically to hydrogen and nitrogen and the stored energy may be released when the hydrogen and nitrogen associate.

An example of a chemical heat storage device is disclosed in EP3006883, which is configured such that a reaction vessel is moved and the heat storage material comprised in the reaction vessel is agitated by a flow force of a heat-exchange fluid which flows along an outer surface of the reaction vessel. EP3396289 discloses another example of a chemical heat storage apparatus comprising a reaction material that may generate heat by reaction with a reaction medium. JPS6152550 discloses another chemical heat storage device to provide hot water.

Another method is chemical looping combustion (CLC). CLC is based on fuel combustion with the use of an intermediate oxygen carrier that is generally cycled between two reactors, i.e. an oxidizing reactor and a reducing reactor, or in a single reactor used alternatingly as oxidizing and reducing reactor. In the oxidizing reactor, a metal is brought into contact with an oxygen-containing gas (also referred to as an oxidizing gas, e.g. air) to produce metal oxides and heat. The heat can subsequently be used for other purposes, for instance to drive a turbine to produce electricity or for direct heating. In the reducing reactor, the fuel (also referred to as a reducing gas, e.g. methane) is contacted with the metal oxide to produce the reduced metal, $CO_2$ and water, while chemically storing the energy of the fuel (see Hossain et al., *Chemical engineering science* 2008, 63, 4433-4451). In general, CLC is used for energy conversion, $CO_2$ capture and to decouple the fuel gases nitrogen gas and $CO_2$ in the fuel combustion and not for the storage of energy.

In WO 2019/050398 a system for energy storage including a chemical combustion reactor submerged in a heat transfer fluid (HTF) tank is disclosed. The chemical combustion reactor is at least partially filled with a metal and the heat generated during reaction of the metal may be transferred to the HTF. WO 2019/050397 discloses a similar energy storage system. Instead of being submerged in an HTF tank, the system comprises heat exchangers that are thermally connected to the chemical combustion reactor. Advantageously, the systems may reduce heat loss and increase control over supply and demand.

Other chemical combustion reactors comprising fixed-beds are disclosed in WO 2006/123925 and WO 2012/144896.

A common drawback of the chemical combustion reactor based storage systems is the possible sintering of the metal within the chemical combustion reactor. Sintering typically increases the internal heat transfer leading to a reduced performance. Furthermore, the generated heat is typically rapidly exchanged to the environment thereby resulting in incomplete redox reactions throughout the longitudinal direction of the reactor.

It is an object of the present invention to at least partially overcome the above-mentioned drawbacks.

Surprisingly, the present inventors found that a chemical combustion reactor comprising a reactor segment comprising at least one active fixed bed, more particularly at least two active beds that are separated by an inactive insulating layer that are at least partially directly surrounded by an insulating mantle provides improved performance in energy storage and supply. Further advantages include providing a balance between a continuous reaction front and a decrease of sintering due to the presence of an inactive insulating layer.

Thus, in a first aspect the invention is directed to a system for energy storage comprising a chemical combustion reactor (1) wherein a flow path (2) is provided in the longitudinal direction of said reactor, said reactor comprising a reactor segment (3) that comprises at least one porous active fixed bed (4) comprising a metal and/or oxide thereof that is at least partially surrounded by an insulating mantle (6) in the longitudinal direction of said reactor. In particular, the present invention is directed to a system for energy storage comprising a chemical combustion reactor (1) wherein a flow path (2) is provided in a longitudinal direction of said reactor, said reactor comprising a reactor segment (3) that comprises at least two porous active fixed beds (4) placed in the flow path, said active beds comprising a metal and/or oxide thereof, wherein said active beds are separated by a porous inactive insulating layer (5), and wherein said active beds and said insulating layer are at least partially directly surrounded by an insulating mantle (6) in the longitudinal direction of said reactor.

Figure 4:
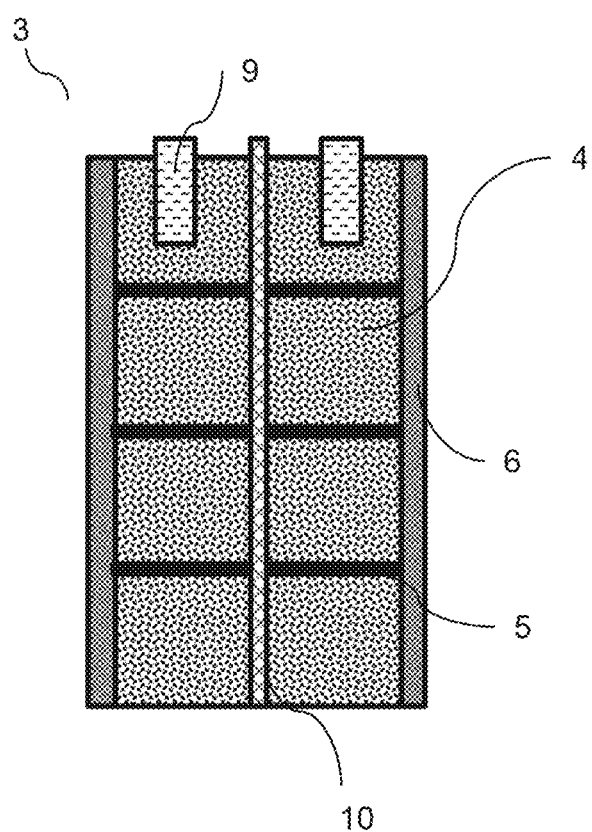

In FIG. 4, a reactor segment comprising heaters and a temperature sensor in accordance with the present invention is illustrated.

Figure 5:
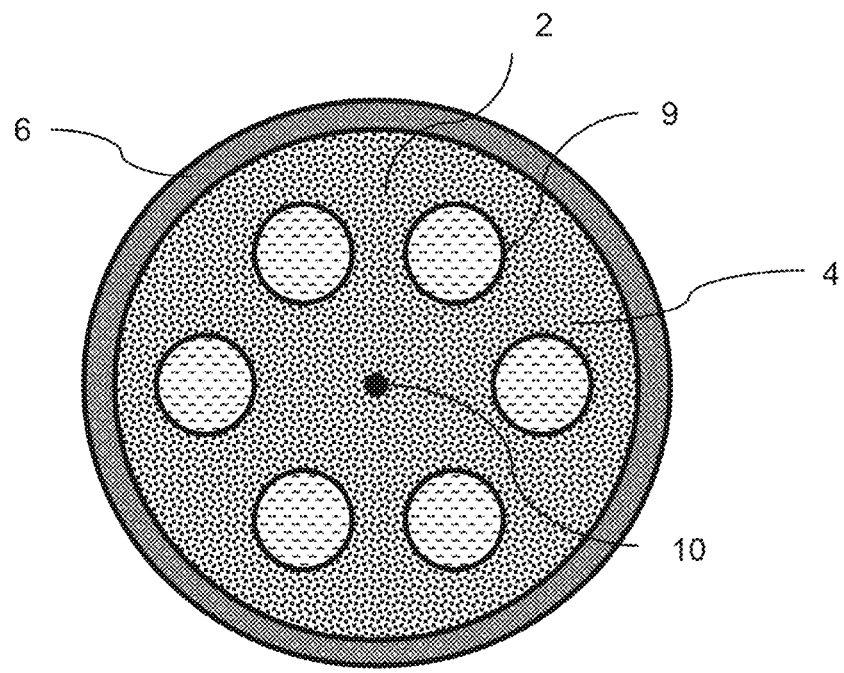

FIG. 5 illustrates a top view of an active bed comprising heaters and a temperature sensor in accordance with the present invention.

Figure 6:
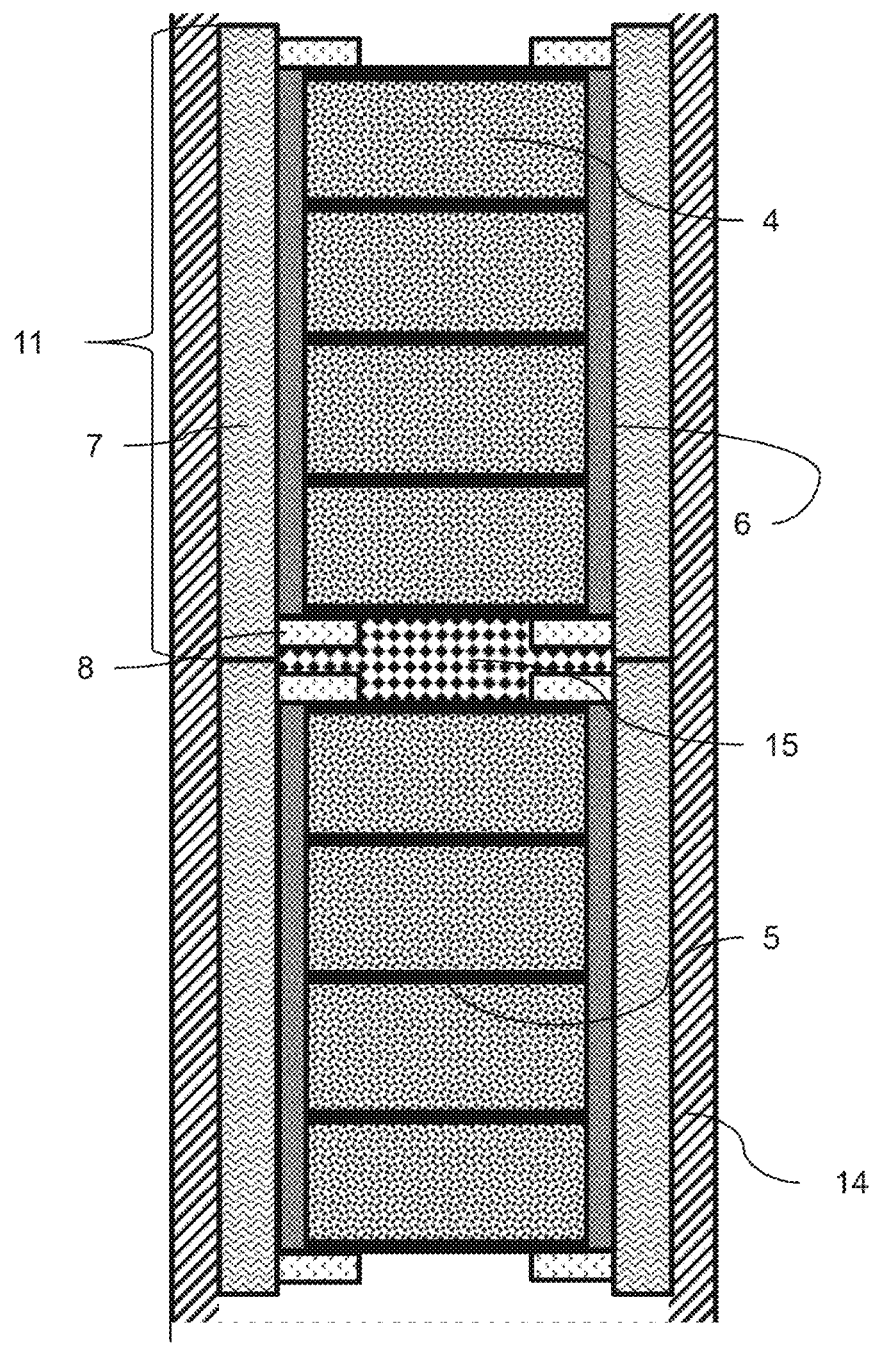

In FIG. 6, a cartridge in accordance with the present invention is illustrated.

Figure 7:
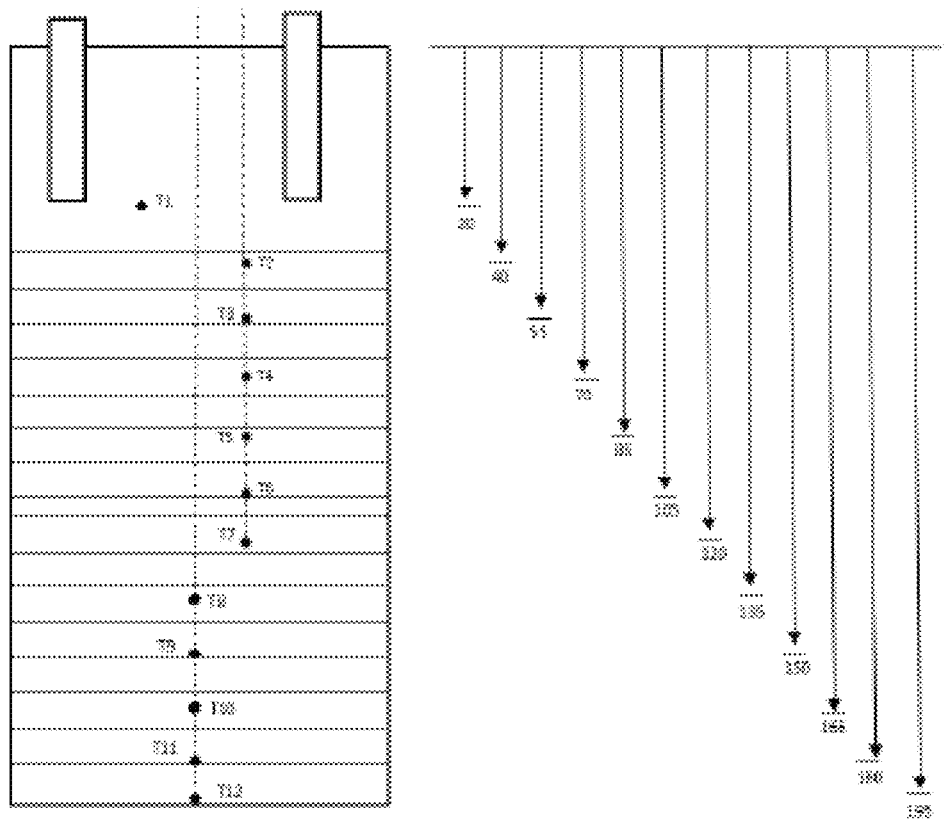

In FIG. 7, part of a reactor segment comprising heaters and thermocouples with several temperature sensors is illustrated.

Figure 8:
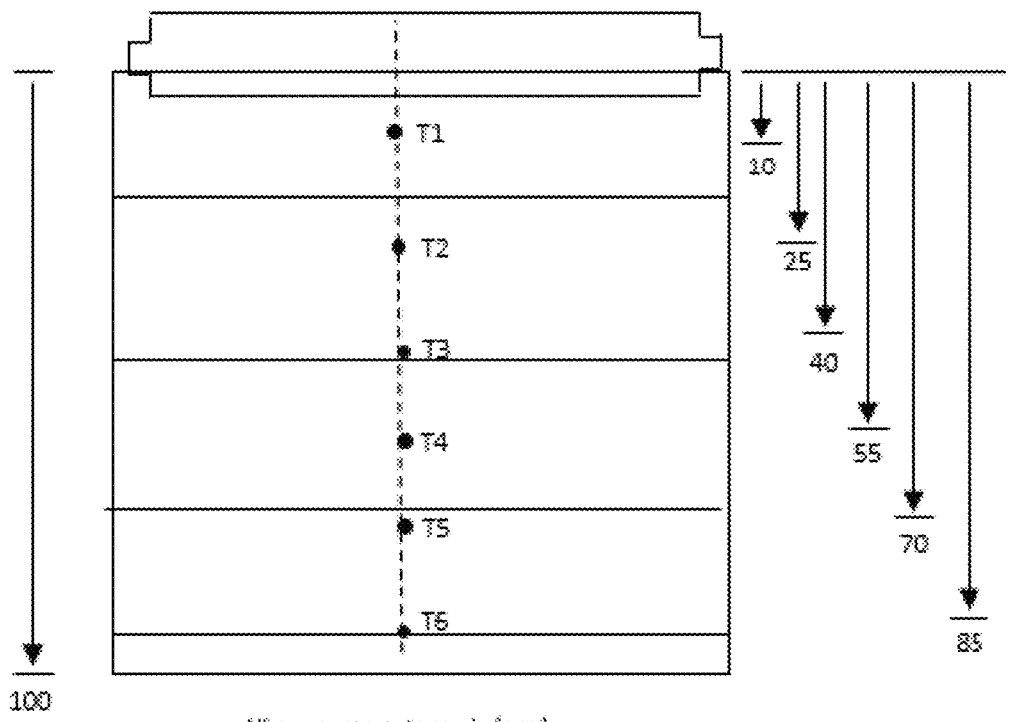

In FIG. 8, part of a reactor segment comprising a linking structure and a thermocouple with several temperature sensors illustrated.

Figure 9:
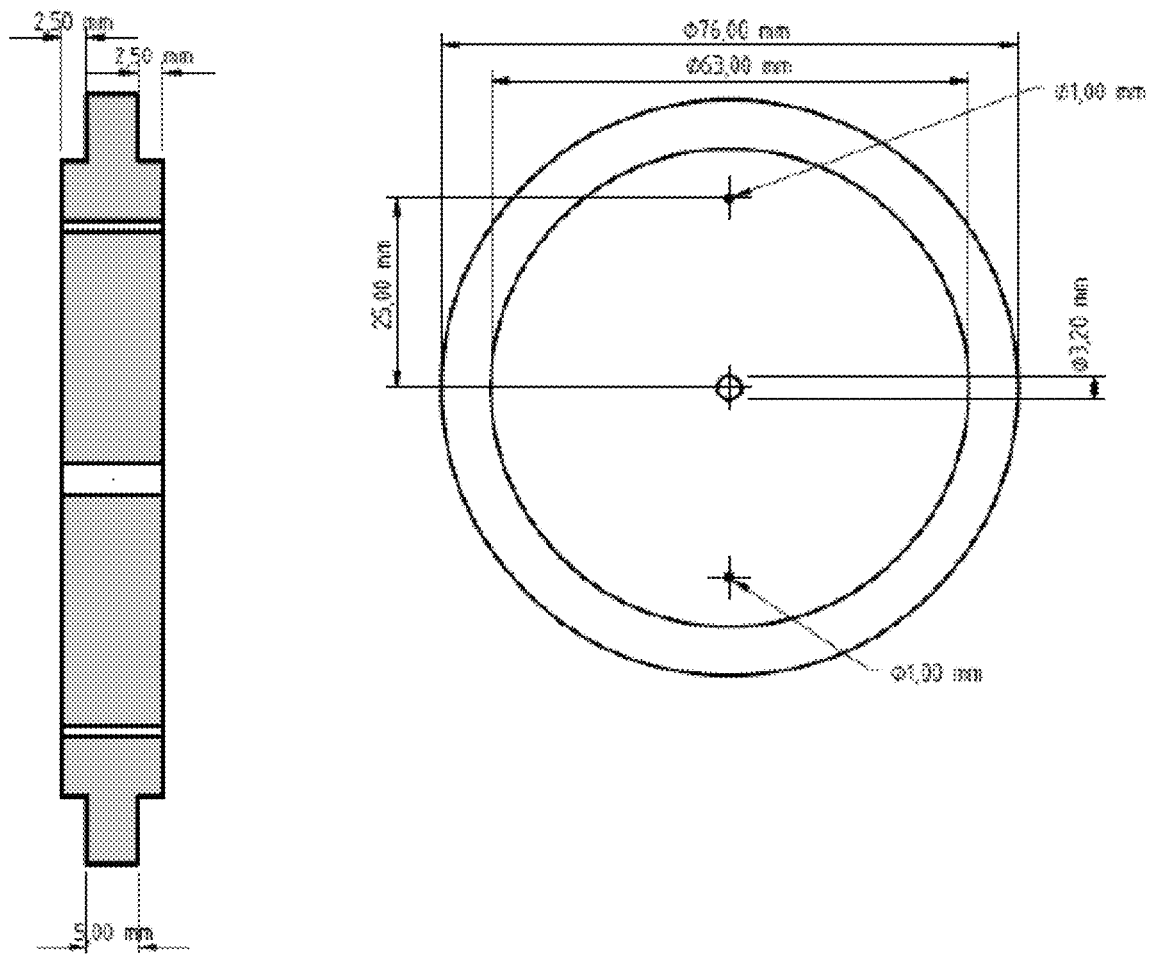

In FIG. 9, details of a linking structure are illustrated.

Figure 1:
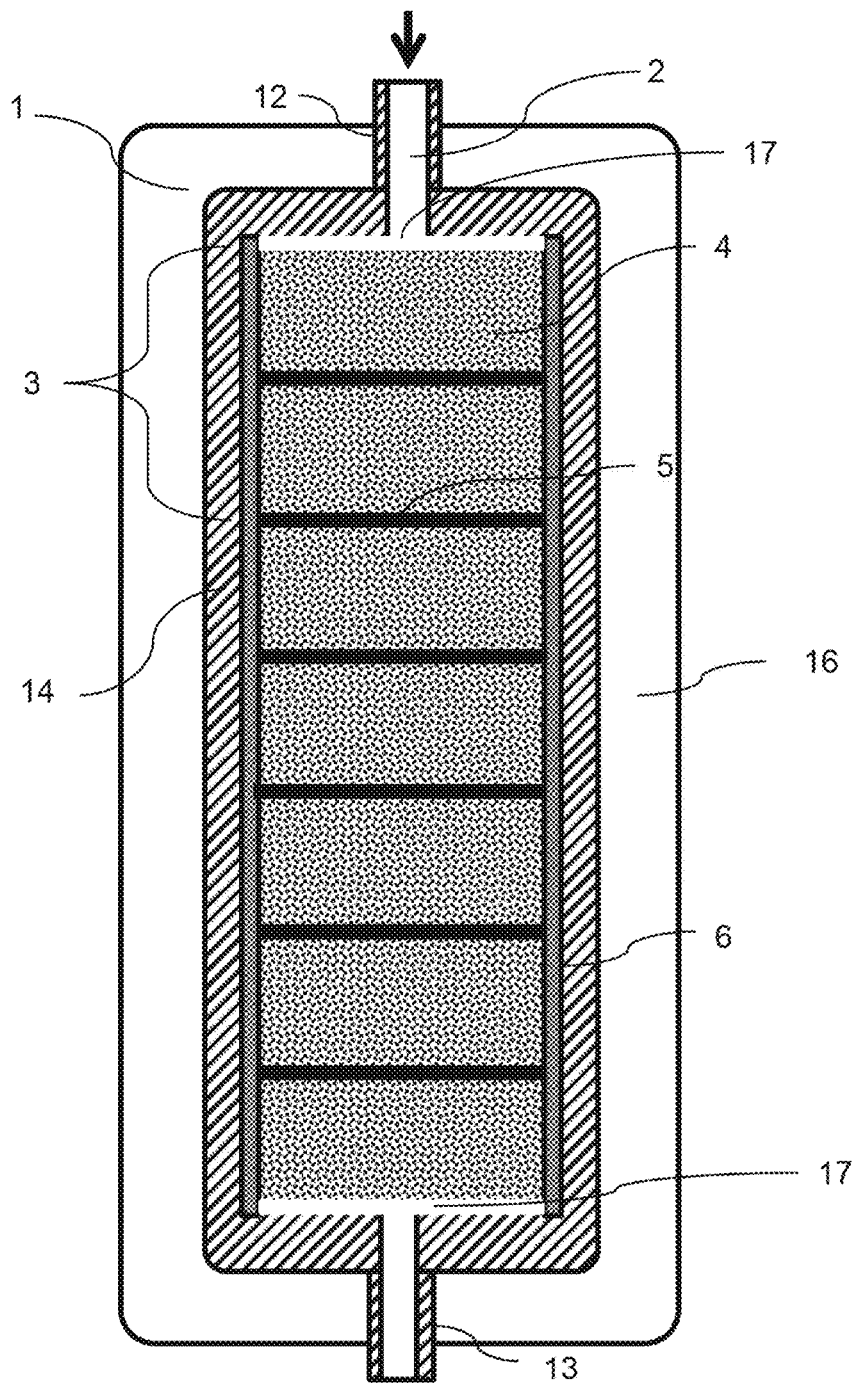
FIG. 1 illustrates an embodiment of the present invention.

A particular embodiment of the chemical combustion reactor (herein also referred to as reactor), wherein a flow path is provided in the longitudinal direction of the reactor is illustrated in FIG. 1. With the term 'chemical combustion reactor' a reactor is meant that allows for both a reduction reaction and an oxidation reaction to occur within the same reaction vessel. The reactor may thus be alternatingly used as oxidizing and reducing reactor. The reactor comprises a reactor segment that comprises at least two porous active fixed beds (herein also referred to as simply the active beds) comprising a metal and/or an oxide thereof (herein also referred to as active material) placed in the flow path. Preferably, the chemical combustion reactor and its constituents have a cylindrical shape. Accordingly, the shape of the active beds (4) may also be referred to as disk shaped (i.e. a flat circular shape). Preferably the beds are stacked in the longitudinal direction with a flat side of a first active bed to a flat side of a second active bed, wherein the flow path (2) is preferably provided perpendicular on the flat sides as also illustrated in FIG. 1. The flow path may be used for a gas stream provided through a gas inlet (12) and removed through a gas outlet (13) as depicted in FIG. 1. Preferably, a spacing (17) is provided between the gas inlet and/or outlet and the active bed as illustrated in FIG. 1. This typically allows for an even distribution of the gas before entering the active beds. Alternatively, it may be preferred to provide a gas-distributer within the spacing. The gas-distributor, e.g. a porous plate, typically actively distributes the gas in such a way that it will be evenly distributed before entering the active bed. During operation of the system, the gas stream typically flows through the active beds and can thus come in contact with the active material, thereby generating a reaction front (i.e. the local site where the gas stream reacts with the metal and/or oxide thereof) that moves through the reactor along the longitudinal direction of the reactor. Flow parameters such as the pressure, temperature, concentration of the reducing and oxidizing agent and flow rate of the gas stream may i.a. be tuned to control the charging (reduction reaction) and discharging (oxidation reaction) of the system. Moreover, it may be favorable to tune the flow parameters over the cycles as typically the active bed slightly changes in shape and/or composition after a cycle.

Advantageously, due to the possibility to alter the flow parameters, the reaction front may move at an optimal rate to remain sharp, thin and locally well-defined such that it moves evenly through the reactor within an optimal range of reaction temperatures. Additionally, a more efficient use of the active material in the chemical combustion reactor is allowed.

Preferably, the reaction front moves through the chemical combustion reactor with a rate in the range of 0.05 to 0.5 mm/s, preferably about 0.2 mm/s. A chemical combustion reactor having a length of 2 meter (which would typically fit in a household environment), being discharged at a rate of 0.2 mm/s would last about 3 hours.

In the present invention, the reactor segment (3) comprises at least two porous active fixed beds (4) placed in the flow path, wherein said active beds are separated by a porous inactive insulating layer (5), and wherein said insulating mantle (6) at least partially surrounds, preferably directly surrounds, said active beds and said insulating layer in the longitudinal direction of said reactor. It was found that the heat conductivity of the reactor segment in the longitudinal direction of the reactor can be favorably tuned by the insulating layer. The insulating layer can thus provide additional means to ensure a balance between the energy produced in the reaction front and the heat that is transferred in the longitudinal direction of the reactor.

The terms "active bed" and "inactive insulating layer" (herein also referred to as inactive or insulating layer) relate to their respective reactivity and use when the system is operated. As explained herein, the active bed comprises a metal and/or an oxide thereof that can undergo a redox reaction to store or release heat. Because the active bed can undergo this redox reaction (typically with oxygen-containing or hydrogen-containing gas) at the condition applied during operation of the system, it is referred to as "active" bed. In contrast, at the same condition, the inactive insulating layer, if present, does essentially not undergo a redox reaction. It is essentially inert at these conditions. Depending on the choice of materials, the difference in reactivity between the active bed and the inactive layer can for instance be achieved by basing the inactive layer on a material having a higher oxidation potential (i.e. more noble and thus less prone to oxidation) with respect to that of the active bed. As such, the metal or the oxide thereof in the active bed can selectively be oxidized. In addition, the resulting oxidized product can then be selectively reduced over the inactive layer as well.

Generally, an activation energy is required to initiate discharging and/or charging. Accordingly, in a preferred embodiment the system further comprises one or more heaters (9) that are thermally connected to at least one active bed. Preferably, the heaters are located in the reactor. This may be at the end of the gas inlet, where the heaters heat up the gas to the extent where enough energy can be provided to initiate the reaction. Alternatively, or additionally, the heaters may be in contact with the active bed as illustrated in FIG. 4 and FIG. 5. The heaters may for instance comprise heating elements that are fully or partially penetrating into the active bed. It is preferred to have the heaters in contact with the active bed, as the reactions typically require a high activation energy and thus high temperatures that may not be provided by a heated gas. The heaters may further be used to reinitiate a reaction after it ceases.

Oxidation and reduction reactions can both either be exothermic or endothermic, depending on the nature of the reactants. Preferably, the oxidation reaction and thus discharging of the reactor is exothermic. The released energy may be used as activation energy for subsequent oxidation reactions. Advantageously, a single initiation of an oxidation reaction may provide a chain of further oxidation reactions without requiring additional energy. In case the reduction reaction is endothermic, a continuous energy supply, such as placing the reactor in an oven, is typically needed for the metal oxide to be reduced in the reactor. Additionally, a continuous energy supply may be necessary for oxidation reactions that are insufficiently exothermic for a subsequent reaction to be initiated. If both the oxidation and reduction reactions are sufficiently exothermic, such energy supply will not be required.

It is preferred that both reduction and oxidation reactions of the active material are exothermic. More preferably, it is preferred that they are sufficiently exothermic to provide the required activation energy for a subsequent reaction. Advantageously, the reaction can be self-sustainable. However, if too much heat would be transferred to the surroundings, the temperature of the chemical combustion reactor can drop below a critical minimal threshold (i.e. the minimum temperature at which the reaction is self-sustainable) and the discharging and/or charging may cease. However, if too little heat would be transferred, the temperature of the chemical combustion reactor can increase above a critical maximum threshold and the active material may sinter, melt, cluster or otherwise be damaged or displaced. The critical minimal threshold depends i.a. on the type of active material, the type of optional inactive material, the flow speed of reactive gases, and concentration of the reducing or oxidizing agent.

The active bed comprises a metal and/or oxide thereof (depending on the charge status of the reactor). The metal may be a mixture of a plurality of metals such as separate metals, metal alloys, minerals, or combinations thereof. In any case, the metal is an active metal meaning that it is not inert but can be oxidized with oxygen. Suitable metals comprise one or more metal elements selected from the group consisting of Al, Ti, V, Cr, Mn, Fe, Co, Ni, Cu, Zn, Zr and Sn, preferably Cu, Fe, Ni, Co, or Mn, preferably Cu, Fe, Ni, Co, and/or Mn. More preferably, the metal comprises copper. The metal may be metallic metal, or may be part of a salt or mineral such as ilmenite. Particularly suitable metals and minerals thereof are for instance described in *Progress in Chemical-Looping Combustion and Reforming Technologies* by Adánez et al., *Progress in Energy and Combustion Science* 38 (2012) p. 215-282 and in *Study of inexpensive oxygen carriers for chemical looping combustion* by Fossdal et al., *International Journal of Greenhouse Gas Control* 5 (2011) p. 483-488.

Figure 2:
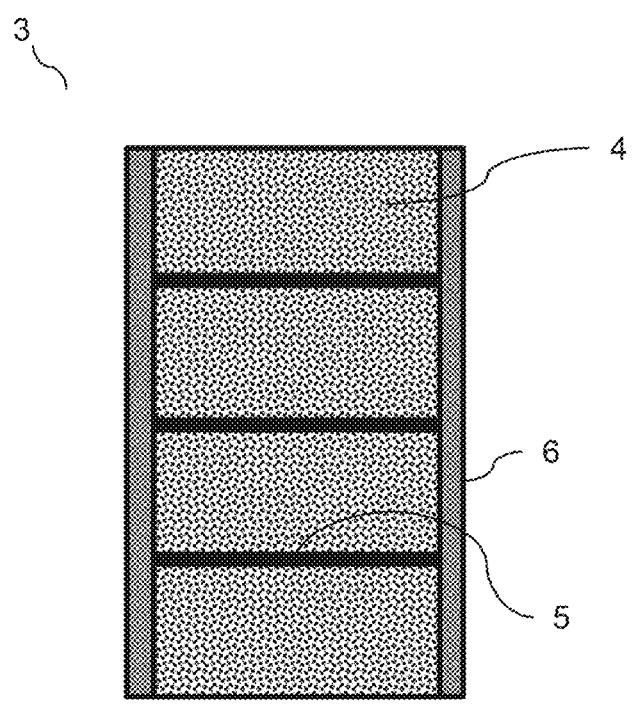
FIG. 2 illustrates a reactor segment in accordance with the present invention.

Furthermore, the active bed is porous to allow the reaction front to pass through the active bed. In a preferred embodiment, the reactor segment comprises at least two active beds as depicted in FIGS. 1 and 2. It is preferred that each bed has an individual porosity between 40-85%, preferably between 50-70%, more preferably between 50-60%, expressed as the percentage void of the total volume occupied by the active bed. The porosity typically provides good access of the gas to the active material, while maintaining optimal use of the space in the reactor to provide a high energy storage density. Moreover, the porosity typically allows the gas to flow through the active bed even when the active material is expanded due to heating. Although each bed may have its individual porosity it is typically preferred when the reactor segment comprises multiple beds that the beds have similar porosities (e.g. between about +/−10% variation from the porosity of the adjacent or other active beds in the segment or reactor). Advantageously, an evenly distributed reaction front may move continuously through the reactor. Generally, this ensures optimal efficiency.

The active bed is typically built up from structures. The shape of the active bed may be tuned to provide optimal storage density and to provide a self-supporting structure (i.e. it should not compress without additional load present). These structures include, but are not limited to a single wire, multiple wires, wovens, non-wovens, particles, casted structures, mesh, grains, disks, rods, porous carriers such as zeolite having a metal and/or oxide thereof on its surface or in its volume, and combinations or stacks thereof. The structures may further be processed to reach the desired porosity e.g. by compression. The structures may for instance be shaped (e.g. woven) from a single or multiple wires. The diameter of the wires is typically tuned for an optimal balance between storage density and efficiency. Typically, the preferred wire diameter is between 0.05 and 0.3 mm. This dimension is particularly preferred for copper-comprising active beds.

The single or multiple wires may comprise a single metal and/or oxide thereof, or it may have a core surrounded by a layer of the metal and/or oxide thereof. The layer may for example be sputtered or coated on the core. The core is typically an inert material, or at least does not participate significantly in the redox reactions under the given circumstances. Materials for such cores typically have a high oxidation resistance and high melting temperatures (e.g. above 1000° C.). Such materials may include stainless steel, ceramics and/or alloys. Generally, the metal oxide is less physically stable than the metal. More metal may be oxidized (e.g. more than 50%) when using wires comprising a core as the core typically provides stability to minimize compromising the active bed. It is moreover possible to add a catalyst to the active bed, this catalyst potentially lowers the reaction temperature or increases the reaction kinetics of the redox reaction taking place with the metal and/or oxide thereof. In general the catalyst may be a noble metal, preferably the catalyst and its respective oxide have a high melting temperature (e.g. above 1000° C.) and low volatility. A preferred catalyst may comprise platinum and/or palladium. The catalyst may be sputtered or coated on the active bed or on the structure before the active bed is formed. Alternatively or additionally, the catalyst may be provided as part of an alloy with the metal. Regardless of the application method, the catalyst and the metal and/or oxide thereof often form an alloy after one or more discharging/charging cycles.

As described herein-above, the reactor segment further preferably comprises a porous inactive insulating layer (5) that separates the at least two active beds. The insulating layer typically tunes the heat conductivity of the reactor segment in the longitudinal direction of the reactor. The insulating layer may thus typically ensures a further control over the balance between the energy produced in the reaction front and the heat that is transferred in the longitudinal direction of the reactor. Accordingly, it preferably comprises a material with lower thermal conductivity than the active beds. Materials for the insulating layer typically have a high oxidation resistance and high melting temperatures (e.g. above 1000° C.). These materials may for instance include ceramics, alloys, and/or stainless steel. Furthermore, the material may be somewhat rigid as the expansion of the heated active beds is typically minimal in the longitudinal direction of the reactor. Similar to the active beds, the shape of the insulating layer may be tuned to provide optimal insulation and to provide a self-supporting structure (i.e. it should not compress without additional load present). The insulating layer may be formed by one or more structures that include, but are not limited to, a single wire, multiple wires, wovens, non-wovens, particles, casted structures, mesh, grains, disks, rods, porous carriers such as zeolite having a metal and/or oxide thereof on its surface, combinations or stacks thereof. The structures may further be processed to reach the desired porosity e.g. by compression. The structures may for instance be shaped (e.g. woven) from a single or multiple wires.

A lower thermal conductivity of the insulating layer typically prevents a too rapid conduction of the heat away from the reaction front. This may be especially beneficial after partial sintering of the active material within the active beds. Advantageously, the lower thermal conductivity may provide efficient use of the active material. It should be noted however, that the insulating layer is preferably not too insulating such that too little heat is transferred within the reactor and the reactions would cease due to hindrance of heating the active material to a temperature higher than the critical minimal temperature required to initiate the reaction to proceed at a sufficiently high speed. The material and its thermal conductivity are typically chosen (e.g. the thickness may be altered) based on the balance between heat produced within a first active bed and heat required for subsequent reactions in a second active bed to occur. Typically, the thermal conductivity of the insulating layer is 20 times less than the thermal conductivity of the active bed, allowing the layer to be thin.

The insulating layer is porous to allow the reaction front (i.a. the gas) to move through the insulating layer. Typically, the porous insulating layer has a porosity of up to 90%, preferably between 5-85%, more preferably between 20-70%, most preferably between 40-60%, expressed as the percentage void of the total volume occupied by the insulating layer. For an even continuation of the reaction front it is preferred that the porosity of the insulating layer is similar to the porosity of the active bed (e.g. between about +/−10% variation from the porosity of the adjacent active bed). It may also be preferred that the reaction front is homogeneously redistributed in the direction perpendicular to the longitudinal direction of the reactor.

The insulating layer typically prevents or at least limits sintering of the active material in those active beds that are separated by sandwiched insulating layer. The layer thus preferably has a higher melting temperature than the active material. Additionally, the material of the insulating layer preferably inhibits sintering with the active material. Advantageously, by reducing sintering of the active material over the entire length of the reactor, the heat generation and heat transfer is well preserved, leading to more efficient use of the active material. In addition, maintenance of the reactor is facilitated if sintering of the active material over the entire length of the reactor is prevented. To further limit sintering of the active material, the active bed and/or insulating layer may comprise an anti-sintering material or catalytic material to lower the activation energy and required temperature. Generally, a small amount or a combination of metals and/or metal oxides such as $ZrO_2$, CaO, Mo and Ce may be sufficient. Additionally, sintering may be limited by choosing a suitable metal and/or an oxide thereof.

It is preferred that the insulating layer is as thin as possible in the longitudinal direction of the reactor. A thinner insulating layer typically enables a higher storage density in the reactor. Dependent on the material the dimensions of the layer may be altered in accordance with the desired thermal conductivity relative to the active material. In particular the ratio between the thickness of the active bed and the thickness of the layer is preferably at least 5:1, more preferably at least 50:1, most preferably at least 100:1.

The reactor segment further comprises an insulating mantle (herein also simply referred to as mantle) that at least partially, preferably entirely, surrounds the active bed in the longitudinal direction of the reactor. The reactor segment further comprises the insulating layer, and accordingly the mantle at least partially, preferably entirely, surrounds the active bed and the insulating layer in the longitudinal direction of the reactor. The mantle is insulating to advantageously enable the reaction front to continuously flow through the reactor, without excess heat transfer to the adjacent layer e.g. the reactor wall (14) as illustrated in FIG. 1, or the surroundings. It should be noted that the insulating mantle is preferably not too little insulating such that too much heat is transferred to the surroundings such that the reactions would cease due to limited heating of the active material to a temperature higher than the critical minimal temperature required to initiate the reaction. The reactor may, however, also be used as heat supply when submerged in a tank (16) as illustrated in FIG. 1 e.g. an HTF tank as disclosed in WO 2019/050398, wherein the insulating mantle transfers heat to the HTF via the adjacent layer (e.g. the reactor wall (14)). The HTF may circulate around the reactor wall (14) due to convection. The tank may also comprise a means to actively circulate the HTF fluid around the reactor wall such as a pump, this is in the art also known as a cooling jacket.

The heated active bed may expand in the direction perpendicular to the flow path. Typically, for a cylindrical shaped active bed comprising copper and/or copper oxide the expansion is approximately 2.5% of the diameter of the active bed. While expanding, the active bed may be permanently deformed or the active bed may compress and/or deform the adjacent material. The active bed may contract again to dimensions similar to its initial state after the reaction front has passed due to a decreased temperature. This can leave a gap between the adjacent layer and the active bed, if no suitable counter-measures would be taken. A subsequent gas stream may therefore partially pass through the gap instead of through the active material, reducing efficiency. For this reason, it is preferred that the mantle comprises a compressible material that after compression at least partially decompresses to its initial shape. Compressible may also be interpreted as flexible, malleable, ductile, elastic, formable and the like which all herein at least mean that the mantle material is preferably capable of at least partially reforming back to its initial shape after deformation. More preferably the material reforms completely back to its initial shape.

To accommodate the expansion and contraction of the active bed by the insulating mantle, it is also preferred that the mantle directly (partially or entirely) surrounds the active bed and optional insulating layer. Directly surrounding herein means that no other layer or structure is placed in between the insulating mantle and the active bed and optional insulating layer assembly. If the active bed does not suffer from expansion and contraction in such an extent that a compressible material is present in the mantle, an additional structure (e.g. an intermediate, rigid wall) may be placed in between the insulating mantle and the active bed and optional insulating layer assembly.

The mantle material preferably has a higher gas flow resistance than the active bed and the optional insulating layer. The higher resistance typically allows for the gas stream to flow through the active material and optional insulating layer instead of leaking to the mantle. The mantle material may therefore comprise ceramics such as ceramic fibers, ceramic fabrics, open- and/or closed-cell ceramic structures, or inert metal meshes, open- and/or closed-cell foams or combinations thereof.

The thickness of the insulating mantle typically depends on the desired balance between insulation and heat transfer. Typically, the thickness of the mantle exceeds the maximum expansion of the active bed. The thickness is preferably 1 to 15% of the easy direction of the active bed perpendicular to the longitudinal direction of the reactor. More preferably the thickness is from 2 to 10%, most preferably from 2 to 6%. Easy direction herein relates to the length of the active bed in the direction that expands the furthest when the active bed is heated. For instance, in a cylindrically shaped reactor the easy direction is the diameter of the active bed.

Figure 3:
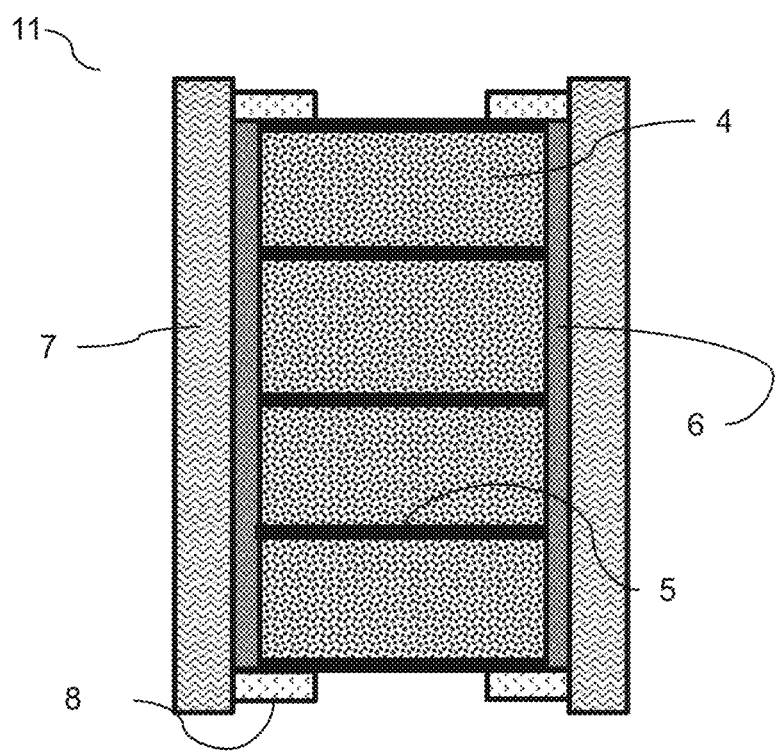
FIG. 3 illustrates a reactor segment comprising a support structure in accordance with the present invention.

The reactor segment further preferably comprises a support structure (7) comprising a fixation element (8) as illustrated in FIG. 3. The support structure supports or carries the active bed, optionally the insulating layer and preferably the insulating mantle as well. The support structure can limit the forces that of the active beds exert on one another and on the optional insulating layer (i.e. the pressure of the load of the higher-placed active bed onto the lower-placed active bed and optional insulating layer). Additional forces may be exerted on the active beds due to a pressure drop over the complete reactor during operation. Limiting the forces can also be achieved by placing the reactor non-vertically, e.g. horizontally (instead of vertically as depicted in the figures), but this will typically face many drawbacks, such as an uneven distribution of condensed water during the reduction phase. The assembly as illustrated in FIG. 3 may be stackable in and removable from the reactor as described herein below, and can accordingly be considered a cartridge (11).

The fixation element may be removably fixated to the support structure to simplify placing the constituents (i.a. active beds and optional insulating layer) in the support structure. The fixation element may for example be in the form of a retaining ring for a cylindrical shaped reactor segment. Usually a fixation element is placed on top of the placed constituents and a fixation element is placed below (in the longitudinal direction of the reactor). It may be preferred to secure one or more of the fixation elements to increase the stability.

An additional aspect of the present invention is directed to the cartridge (11) comprising a reactor segment and a support structure. An example of such cartridge is illustrated in FIGS. 3 and 6. The cartridge is preferably adapted to be removable from and stackable within the reactor. FIG. 6, moreover, illustrates the stackable nature of the cartridges within the reactor. Generally, when a defect occurs only a part of the reactor requires replacement. Cartridges allow this replacement in an easy fashion to restore functionality of the reactor. Additionally, it typically allows for full replacement of the content of the reactor in an simple manner.

A gap filled with a linking structure (15), as depicted in FIG. 6, can be created when stacking two or more reaction segments comprising a support structure or when stacking two or more cartridges. This linking structure may advantageously be placed to enable a gapless continuation of the reaction front from one reaction segment to a second reaction segment. The linking structure may comprise an additional active bed, or at least it may comprise the same active material. Additionally or alternatively, it may comprise an insulating material (e.g. similar to the material used for the insulating layer). The chosen material may for instance be dependent on the dimensions of the gap.

The system preferably comprises a temperature sensor (10), as illustrated in FIGS. 4 and 5, that is preferably located in the chemical combustion reactor such that it can measure a representative temperature of at least one active bed. The sensor is typically used as an indication of the movement of the reaction front. The sensor may comprise a thermocouple with one or more measurement points. Additionally or alternatively, it may comprise temperature fiber optic sensors such as fiber Bragg grating sensors, for example glass fibers. Advantageously, these fibers have a small diameter that may minimize the influence on the performance of the reactor. Furthermore, the glass typically does not interfere significantly with the heat transfer. The temperature sensor may further also be used as a support structure.

The temperature sensor usually measures a representative temperature of at least one active bed. The representative temperature may depend on the shape of the active bed. For a cylindrical active bed, the representative temperature is typically in the center of the active bed.

The temperature within the reactor may be dependent on the active material used as the temperature typically rises up to the melting temperature of the active material. For instance, when using copper and/or copper oxide the temperature may rise up to 1000° C. Therefore, the temperature sensor should withstand such temperatures and should be capable of measuring these. Moreover, it is typically required that all constituents within the system are able to withstand the obtained temperatures.

The system may comprise multiple chemical combustion reactors as described herein. Typically, energy for a couple hours is provided from one reactor. A plurality of reactors may thus be used as energy supply for short periods e.g. for households when the renewable energy source is low. In embodiments with the plurality of the chemical combustion reactors, it is preferred that each reactor can be operated (i.e. charged and discharged) independently. This provides additional flexibility to the system and enables for instance simultaneous charging and discharging of the system and energy conversion, which may be desirable during a change of circumstances, such as going from an energy excess to shortage or vice versa.

Charging of the chemical combustion reactor can be carried out by providing a reducing gas stream, preferably a reducing gas stream comprising methane or hydrogen, and leading the reducing gas stream into the reactor and allowing the reducing gas stream to react with a metal oxide in the reactor to reduce the metal oxide. Accordingly, it may be preferred that the system further comprises a reducing gas supply system. As a preferred reducing gas, hydrogen is used. This gas advantageously typically only produces water upon charging of the reactor. As the temperatures are often sufficiently high for the water to be gaseous, it may be preferred that the system further comprises a condenser to liquefy the water. Moreover, it may be preferred to use the water as a source for subsequent gas streams.

Discharging of the chemical combustion reactor can be carried out by providing an oxidizing gas stream, preferably an oxidizing gas stream comprising oxygen, and leading the oxidizing gas stream into the reactor and allowing the oxidizing gas stream to react with the metal to oxidize the metal. Accordingly, it may be preferred that the system further comprises an oxidizing gas supply system.

Generally, a single inlet and a single gas outlet for the chemical combustion reactor is preferred, as this improves the reliability and decreases the chance of system failures. The inlet and outlet of the reactor can be used as such for both the reduction and the oxidation gas streams, such that the reactor is discharged and charged with gas streams flowing in the same direction. However, the direction in which the reactor is charged may also be reverse of the direction in which the reactor is discharged. In such embodiment, the inlet and outlet may thus switch their function: the inlet becomes the outlet and vice versa.

Further aspects of the present invention are directed to methods for charging and discharging the system. A particular method for storing energy in a system in accordance with the present invention comprises providing a reducing gas stream, preferably a reducing gas stream comprising hydrogen gas, and leading said reducing gas stream into the chemical combustion reactor and allowing the reducing gas stream to react with a metal oxide in the chemical combustion reactor to reduce the metal.

A particular method for discharging energy from a system in accordance with the present invention comprises providing an oxidizing gas stream, preferably an oxidizing gas stream comprising oxygen gas, and leading said oxidizing gas stream into the reactor and allowing the oxidizing gas stream to react with a metal in the reactor to oxidize the metal.

For the purpose of clarity and a concise description features are described herein as part of the same or separate embodiments, however, it will be appreciated that the scope of the invention may include embodiments having combinations of all or some of the features described.

The project leading to this application has received funding from the *European Unions' Horizon* 2020 *research and innovation programme* under grant agreement No 766464.

The present invention can be illustrated by the following non-limiting examples.

Example 1—Reactor Segment Comprising Copper Active Beds

A tube shaped reactor segment was made in a stainless steel tube containing 17 active beds separated by inactive insulating layers and surrounded by an insulating mantle.

Materials Used

The active beds were stacks of copper meshes and had a diameter of 77.5 mm. The copper mesh structure was prepared from wires with about 0.1 mm diameter. The porosity of the active beds was 76%. The copper mass was 2185.8 g.

The insulating mantle had a thickness of 1 mm.

Further, the inactive insulating layers were stainless steel (SS) meshes, with a 77.5 mm diameter and a wire diameter of about 0.2 mm.

Six heater elements were used.

A stainless steel tube with a length of 200 mm and retaining rings were used to assemble the reactor segment.

Assembly

The reactor segment was assembled using multipoint thermocouples. A stainless steel tube with 200 mm length was used. The six heaters were set in the upper part with a depth of approximately 35 mm.

The stainless steel meshes were inserted in between of the copper active beds every 1.5 cm to match the spacing of the thermocouples. The head of a thermocouple with 6 sensors was placed 5 mm in the active bed. Two layers of insulation material were used in the entire length of the reactor segment.

A 80 mm diameter circular filter of stainless steel mesh was place on the bottom to prevent small particle pollution and a retaining ring was used to hold it. The heaters were inserted in the stacks of active beds as illustrated in FIG. 4 and the active beds were stacked and kept in place via compression on the top and bottom before the insulation mantle was placed around it. The stack including insulating mantle was carefully inserted in the stainless steel tube. The total mass of the cartridge was 3355.1 g.

The internal layout with the temperature sensors of the cartridge is schematically illustrated in FIG. 7, wherein the measurements are in mm. In FIG. 7 the dotted lines indicate the thermocouples with the black dots as temperature sensors

Example 2—Reactor Segment Comprising Copper Active Beds

A tube shaped reactor segment was made of a stainless steel tube containing 6 active beds separated by inactive insulating layers and surrounded by an insulating mantle.

Materials Used

The active beds were stacks of copper meshes and had a diameter of 77.5 mm. The copper mesh structure was prepared from wires with about 0.1 mm diameter. The porosity of the active beds was 76%. The copper mass was 1022.23 g.

The insulating mantle had a thickness of 1 mm.

Further, the inactive insulating layers were stainless steel (SS) meshes, with a 77.5 mm diameter and a wire diameter of about 0.2 mm.

A stainless steel tube of 100 mm length and retaining rings were used to assemble the cartridge.

Assembly

The reactor segment was assembled using a multipoint thermocouple. The stainless steel meshes were inserted in the middle of the copper active beds every 1.5 cm to match the spacing of the thermocouple.

Two layers of insulation material were used in the entire length of the reactor segment.

The active beds were separated by the inactive stainless steel meshes were stacked and kept in place via compression on the top and bottom before insulation mantle was placed around. The stack was carefully inserted in the stainless steel tube such that the insulation mantle kept in place. The total mass of the cartridge was 1382.2 g. At the bottom a filter element was inserted between the last active bed and a retaining ring.

The internal layout of the reactor segment is schematically illustrated in FIG. 8, where the dotted line indicates the thermocouple with the black dots as temperature sensors. The linking structure is positioned at the top of this bottom segment.

Example 3—Linking Structure

A stack of copper meshes with a total mass of 99.93 g was used. Small holes were drilled in the linking structure to bind the copper meshes together using copper wire. A single plie layer of insulating material was applied to the outer perimeter of the linking structure, which was held in place by copper wire before the mass was weighted. A schematic illustration and top view hereof is illustrated in FIG. 9.

Example 4—Stacking of Reactor Segments

The reactor segments according to Example 1 and Example 2 are stacked and connected by a linking structure according to Example 3. The total length was 300 mm with a copper mass of 3307.7 g. A schematic overview of stacking is illustrated in FIG. 6.

The invention claimed is:

1. A system for energy storage comprising a chemical combustion reactor (1) wherein a flow path (2) is provided in a longitudinal direction of said reactor, said reactor comprising a reactor segment (3) that comprises at least two porous active fixed beds (4) placed in the flow path, said porous active fixed beds comprising a metal and/or oxide thereof, wherein said at least two porous active fixed beds (4) comprising a metal and/or oxide thereof are configured for said metal and/or oxide thereof to undergo oxidation and reduction reactions, wherein said porous active fixed beds are separated by a porous inactive insulating layer (5), and wherein said porous active fixed beds and said porous inactive insulating layer are at least partially directly surrounded by an insulating mantle (6) in the longitudinal direction of said reactor, wherein said insulating mantle is surrounded by a reactor wall.

2. System according to claim 1, wherein said reactor segment (3) comprises a support structure (7) that is longitudinally aligned in the direction of said reactor and comprised between said porous inactive insulating layer and said reactor wall, wherein said support structure comprises a fixation element (8) that is adapted for supporting said at least two porous active beds (4).

3. System according to claim 1, further comprising one or more heaters (9), located in the chemical combustion reactor (1) such that they said one or more heaters are thermally connected to at least one of said porous active fixed beds (4).

4. System according to claim 1, further comprising a temperature sensor (10), located in the chemical combustion reactor (1) and adapted to measure a representative temperature of at least one of said porous active fixed beds (4).

5. System according to claim 1, wherein both reduction and oxidation reactions of said metal and/or oxide thereof are exothermic.

6. System according to claim 1, wherein said metal and/or oxide thereof comprises a metal element selected from the group consisting of Al, Ti, V, Cr, Mn, Fe, Co, Ni, Cu, Zn, Zr, Sn and combinations thereof.

7. System according to claim 1, wherein said porous active fixed beds (4) further comprise platinum and/or palladium.

8. System according to claim 1, wherein said porous active fixed beds (4) individually have a porosity between 40-85%, expressed as the percentage void based on the total volume occupied by the active bed.

9. System according to claim 1, wherein said porous insulating layer (5) comprises an inactive material with lower thermal conductivity than said metal and/or oxide thereof.

10. System according to claim 1, wherein said porous insulating layer (5) has a porosity of up to 90%, expressed as the percentage void of the total volume occupied by the insulating layer.

11. System according to claim 1, wherein said insulating mantle (6) comprises a compressible material that after compression at least partially decompresses to its initial shape, and wherein said insulating mantle has a higher gas-flow resistance than each of said active beds.

12. A cartridge (11) for use in the system according to claim 1, comprising a reactor segment (3), and a support structure for supporting said reactor segment, wherein said cartridge is adapted to be removable from and stackable within the chemical combustion reactor (1).

13. Method for storing energy in the system according to claim 1, said method comprising providing a reducing gas stream, the reducing gas stream being a reducing gas stream comprising hydrogen gas, and leading said reducing gas stream into the chemical combustion reactor (1) and allowing the reducing gas stream to react with a metal oxide in the chemical combustion reactor to reduce the metal oxide.

14. Method for discharging energy from the system according to claim 1, said method comprising providing an oxidizing gas stream, the oxidizing gas stream comprising oxygen gas, and leading said oxidizing gas stream into the chemical combustion reactor (1) and allowing the oxidizing gas stream to react with a metal in the chemical combustion reactor to oxidize the metal.

15. System according to claim 1, wherein said reactor segment (3) comprises a support structure (7), wherein said support structure comprises a fixation element (8) that is adapted for supporting at least said porous active fixed beds (4) and said insulating layer (5) in the chemical combustion reactor (1).

16. System according to claim 1, further comprising one or more heaters (9) located in the chemical combustion reactor (1) such that said one or more heaters are thermally connected to at least one of the porous active fixed beds (4), wherein said one or more heaters comprise a heating element penetrating the porous active fixed bed it is thermally connected to.

17. System according to claim 1, further comprising a temperature sensor (10), located in the chemical combustion reactor (1) and adapted to measure a representative temperature of at least one of the porous active fixed beds (4), wherein said temperature sensor comprises a sensor element penetrating the porous active fixed bed for which the temperature sensor is adapted to measure the temperature of.

18. System according to claim 1, wherein said porous insulating layer (5) comprises an inactive material that comprises stainless steel.

19. System according to claim 1, wherein said insulating mantle (6) comprises a compressible material that, after compression, completely decompresses to its initial shape, and wherein said insulating mantle has a higher gas-flow resistance than each of said active beds.

20. System according to claim 1, wherein said metal and/or oxide thereof comprises copper.

* * * * *